US009629057B2

(12) United States Patent
Fukuta

(10) Patent No.: US 9,629,057 B2
(45) Date of Patent: Apr. 18, 2017

(54) MOBILE COMMUNICATION SYSTEM, BASE STATION, PROCESSOR, AND COMMUNICATION CONTROL METHOD

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/647,809

(22) PCT Filed: Nov. 11, 2013

(86) PCT No.: PCT/JP2013/080396
§ 371 (c)(1),
(2) Date: May 27, 2015

(87) PCT Pub. No.: WO2014/084028
PCT Pub. Date: Jun. 5, 2014

(65) Prior Publication Data
US 2015/0312836 A1    Oct. 29, 2015

Related U.S. Application Data

(60) Provisional application No. 61/730,618, filed on Nov. 28, 2012.

(51) Int. Cl.
*H04W 36/00*  (2009.01)
*H04W 36/38*  (2009.01)
(Continued)

(52) U.S. Cl.
CPC ........ *H04W 36/38* (2013.01); *H04W 36/0061* (2013.01); *H04W 36/0072* (2013.01); *H04W 36/08* (2013.01); *H04W 76/043* (2013.01)

(58) Field of Classification Search
None
See application file for complete search history.

(56) References Cited

U.S. PATENT DOCUMENTS

2011/0243010 A1\* 10/2011 Geirhofer ............. H04W 52/08
370/252
2013/0070663 A1\* 3/2013 Gunnarsson ...... H04W 36/0083
370/315
(Continued)

FOREIGN PATENT DOCUMENTS

JP       2012-9945 A    1/2012
WO     2011/109027 A1   9/2011
(Continued)

OTHER PUBLICATIONS

International Search Report; PCT/JP2013/080396; Jan. 7, 2014.
(Continued)

*Primary Examiner* — Adolf Dsouza
(74) *Attorney, Agent, or Firm* — Studebaker & Brackett PC

(57) ABSTRACT

A mobile communication system comprises: a base station configuring a D2D supporting cell that supports D2D communication that is direct device to device communication; and a user terminal that performs the D2D communication in the D2D supporting cell. The base station comprises a control unit that controls handover of the user terminal. The control unit controls the handover on the basis of a support state of the D2D communication in a cell to which the user terminal performs handover.

13 Claims, 11 Drawing Sheets

(51) Int. Cl.
    *H04W 36/08*    (2009.01)
    *H04W 76/04*    (2009.01)

(56)    References Cited

U.S. PATENT DOCUMENTS

2015/0016387 A1\*  1/2015  Elmdahl ............. H04W 52/244
                                                    370/329
2015/0271733 A1\*  9/2015  Li ....................... H04W 76/043
                                                    455/445

FOREIGN PATENT DOCUMENTS

WO    2011/116017 A1    9/2011
WO    2011/147462 A1   12/2011

OTHER PUBLICATIONS

Written Opinion of the International Searching Authority; PCT/JP2013/080396; Jan. 7, 2014.
3GPP TR 22.803 V0.3.0 (May 2012); 3rd Generation Partnership Project; Technical Specification Group SA; Feasibility Study of Proxmity Services (ProSe) (Release 12); pp. 1-24.
The extended European search report issued by the European Patent Office on Jun. 28, 2016, which corresponds to European Patent Application No. 13858061.8-1854 and is related to U.S. Appl. No. 14/647,809.
Office Action issued by the Japanese Patent Office on Feb. 21, 2017 in corresponding Japanese Patent Application No. 2016-222190 with Concise Statement of Relevance; 3pp.

\* cited by examiner

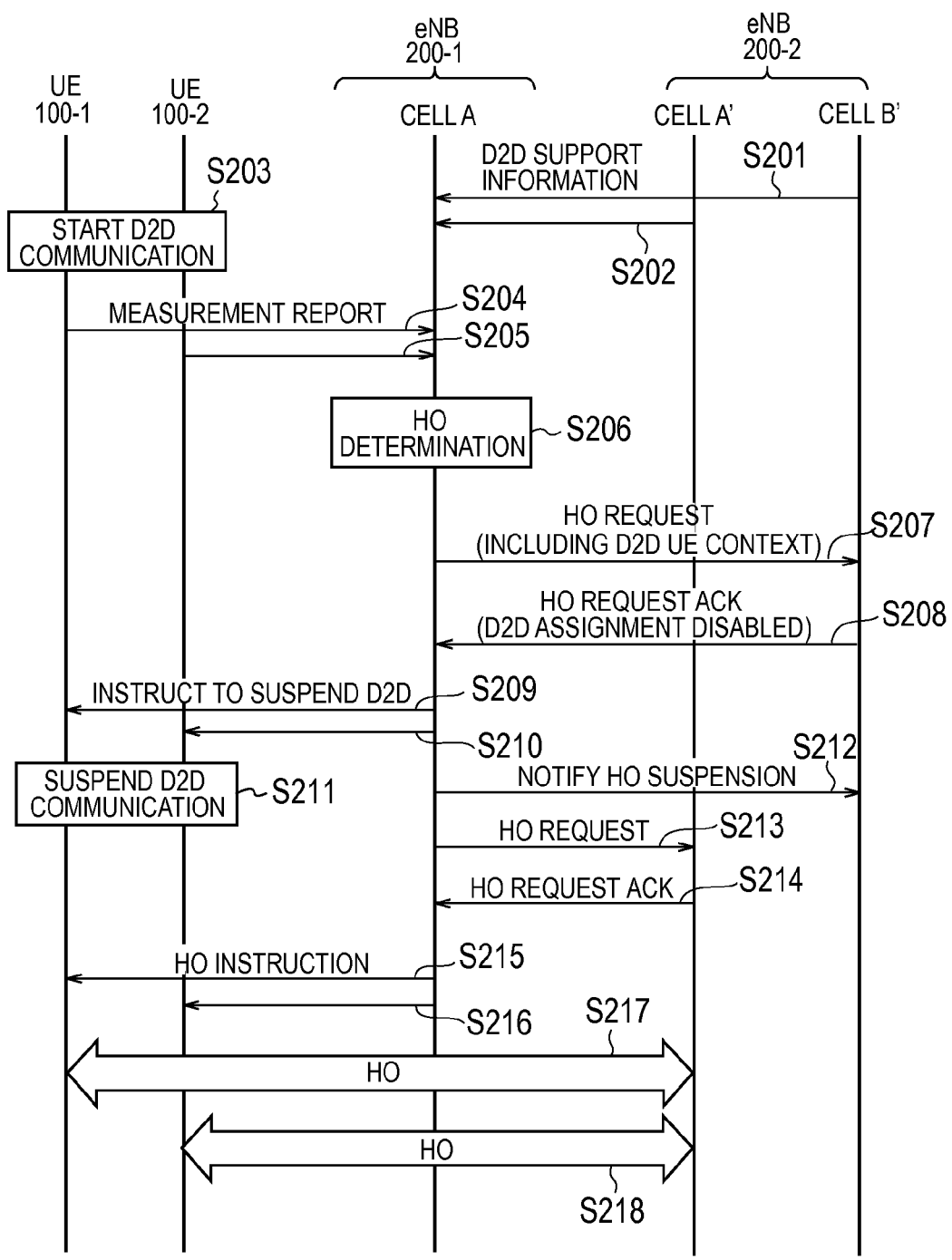

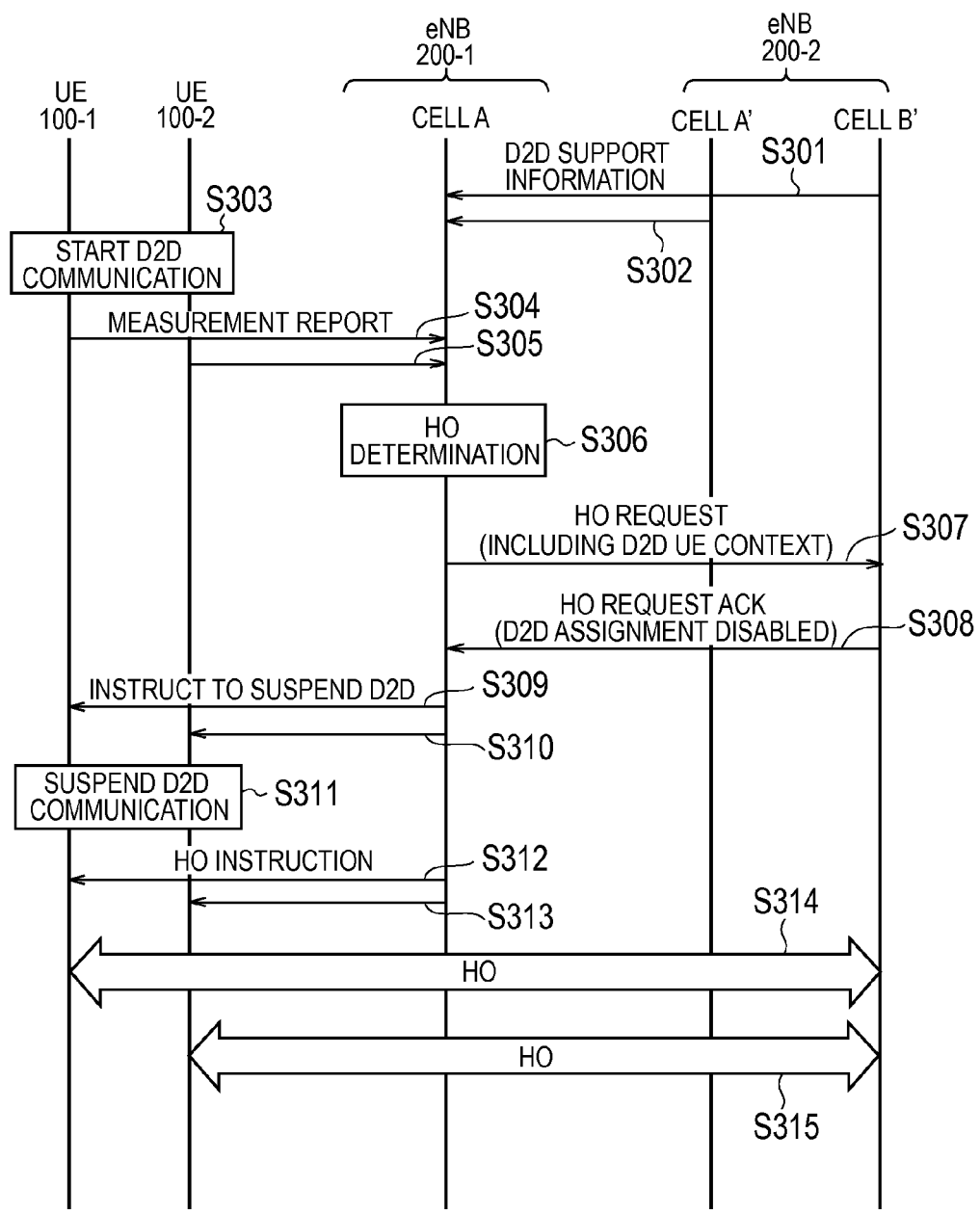

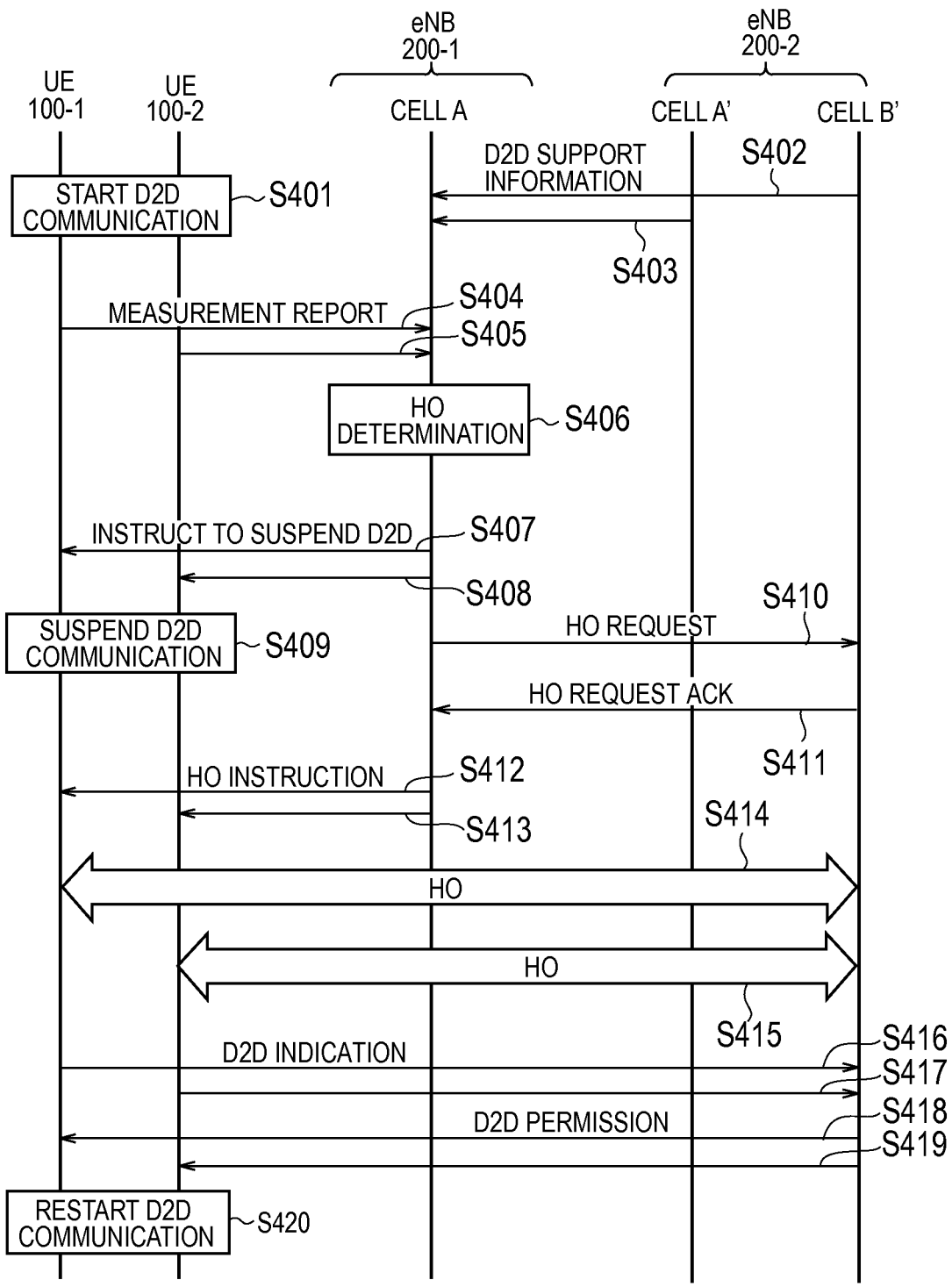

US 9,629,057 B2

MOBILE COMMUNICATION SYSTEM, BASE STATION, PROCESSOR, AND COMMUNICATION CONTROL METHOD

TECHNICAL FIELD

The present invention relates to a mobile communication system that supports D2D communication, a base station, a processor, and a communication control method.

BACKGROUND ART

In a 3GPP (3rd Generation Partnership Project) which is a project aiming to standardize a mobile communication system, the introduction of Device to Device (D2D) communication is discussed as a new function after Release 12 (see non patent document 1).

The D2D communication is a communication mode in which a user terminal group including a plurality of adjacent user terminals performs communication without passing through a core network within a frequency band assigned to the mobile communication system.

The D2D communication is assumed to be controlled under the initiative of the base station. Therefore, a user terminal during D2D communication is in a state (connected state) in which the user terminal establishes a connection with a cell in the base station.

PRIOR ART DOCUMENT

Non-Patent Document

Non-Patent Document 1: 3GPP technical report "TR 22.803 V0.3.0" May 2012

SUMMARY OF THE INVENTION

However, not all the cells in the mobile communication system support the D2D communication. That is, a cell that supports the D2D communication and a cell that does not support the D2D communication may be coexistent.

Therefore, there is a problem that, when handover to the cell that does not support the D2D communication is performed, a user terminal during the D2D communication is not able to continue the D2D communication (that is, the D2D communication is interrupted).

Therefore, the present invention provides a mobile communication system, a base station, a processor, and a communication control method, with which it is possible to appropriately control handover for a user terminal during the D2D communication.

A mobile communication system according to one embodiment comprises: a base station configuring a D2D supporting cell that supports D2D communication that is direct device to device communication; and a user terminal that performs the D2D communication in the D2D supporting cell. The base station comprises a control unit that controls handover of the user terminal. The control unit controls the handover on the basis of a support state of the D2D communication in a cell to which the user terminal performs handover.

BRIEF DESCRIPTION OF THE DRAWINGS

FIG. 13 is a sequence diagram of an operation pattern 2 according to the second embodiment.

FIG. 14 is a sequence diagram of an operation pattern 3 according to the second embodiment.

FIG. 15 is a sequence diagram according to a third embodiment.

DESCRIPTION OF THE EMBODIMENT

Figure 1:
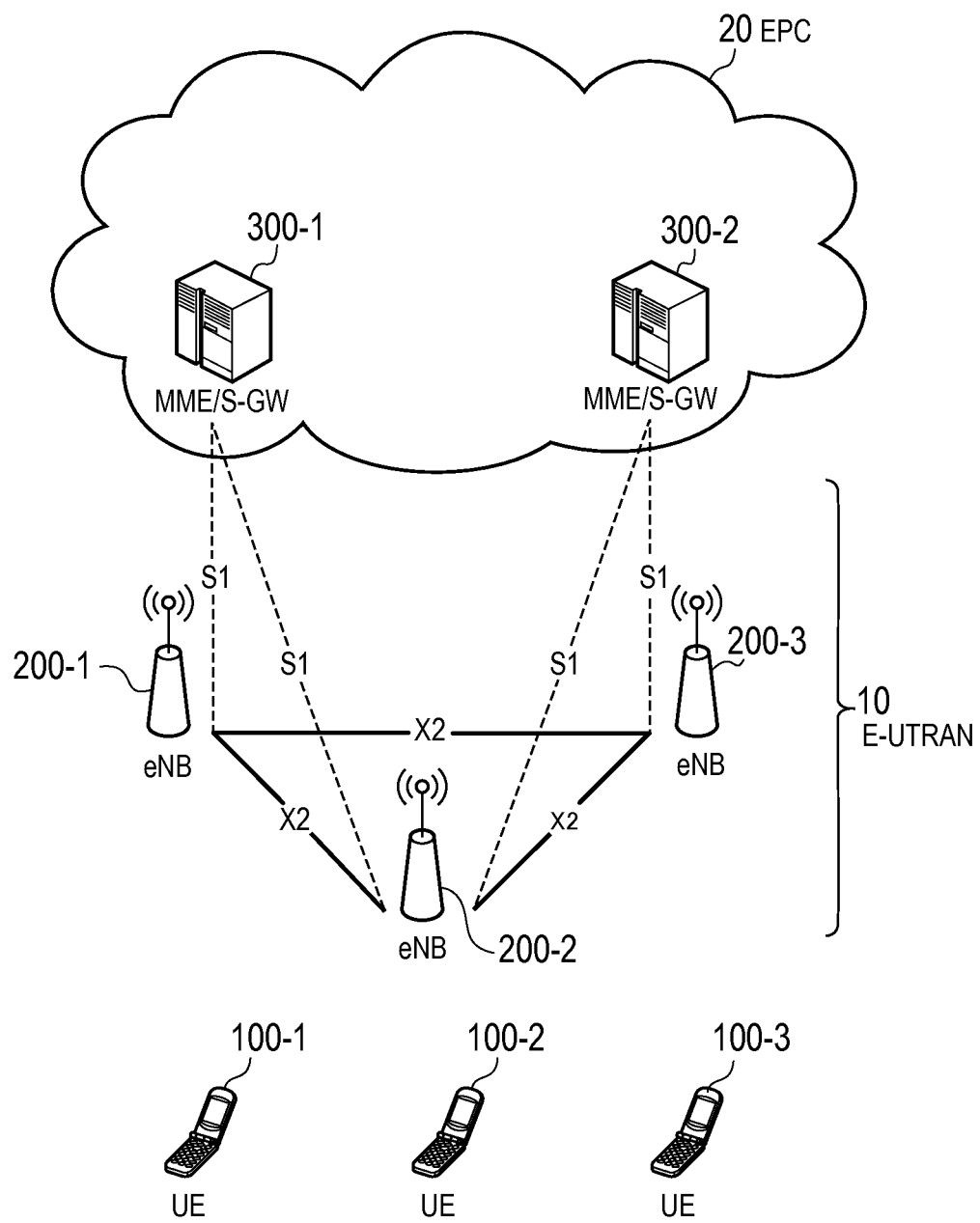
FIG. 1 is a configuration diagram of an LTE system according to a first embodiment to a fourth embodiment.

Hereinafter, embodiments of the present invention will be described with reference to the accompanying drawings. Note that in the following drawing according to the embodiments, identical or similar symbols are assigned to identical or similar portions.

Overview of Embodiment

A mobile communication system according to embodiments includes a base station configuring a D2D supporting cell that supports D2D communication that is direct device to device communication, and a user terminal that performs the D2D communication in the D2D supporting cell. The "direct device to device communication" is at least device to device communication without passing through a core network. The base station includes a control unit that controls handover of the user terminal. The control unit controls the handover on the basis of a support state of the D2D communication in a cell to which the user terminal performs handover. Accordingly, if a cell that supports the D2D communication and a cell that does not support the D2D communication are coexistent, it is possible to appropriately control handover.

In a first embodiment, the base station configures, in addition to the D2D supporting cell, another D2D supporting cell that supports the D2D communication. When determining to perform the handover from the D2D supporting cell to the other D2D supporting cell, the control unit controls so that the handover is performed while causing the user terminal to maintain the D2D communication. Accordingly, handover can be performed while the user terminal maintains the D2D communication between cells configured by the same base station.

In a second embodiment to a fourth embodiment, the mobile communication system further includes a neighboring base station configuring a neighboring cell adjacent to the D2D supporting cell. The neighboring base station transmits, to the base station, D2D support information related to the support state of the D2D communication in the neighboring cell. The control unit controls the handover to the neighboring cell on the basis of the D2D support information. Accordingly, even when a cell to which the user terminal performs handover is a cell (neighboring cell) of the neighboring base station, it is possible to appropriately control the handover.

In a second embodiment, the neighboring cell supports the D2D communication, and supports the handover during which the D2D communication is maintained. When determining to perform the handover from the D2D supporting cell to the neighboring cell, the control unit controls so that the handover is performed while causing the user terminal to maintain the D2D communication. Accordingly, it is possible to perform handover while the user terminal maintains the D2D communication between cells configured by different base stations.

In the second embodiment, when determining to perform the handover from the D2D supporting cell to the neighboring cell, the control unit transmits, to the neighboring base station, a handover request that includes information indicating that the user terminal is performing the D2D communication. Accordingly, the neighboring base station is able to determine whether to permit the handover request, in consideration that the user terminal is performing the D2D communication. Furthermore, the neighboring base station is able to perform preparation, such as security of a radio resource for the D2D communication.

In the second embodiment, when permitting the handover request, the neighboring base station transmits, to the base station, a permission response that includes D2D assignment information related to assignment of the radio resource for the D2D communication in the neighboring cell. Accordingly, the base station is able to appropriately control handover, in consideration whether the radio resource for the D2D communication is assigned in the neighboring base station.

In the second embodiment, when the permission response from the neighboring base station is received and the D2D assignment information indicates that the radio resource for the D2D communication is not able to be assigned, the control unit suspends the handover to the neighboring cell. Accordingly, the D2D communication can be suspended before handover, so that it is possible to avoid the occurrence of an unexpected error caused by suspending the D2D communication immediately after the handover.

In the second embodiment, when the permission response from the neighboring base station is received and a frequency to which the D2D supporting cell belongs is different from a frequency to which the neighboring cell belongs, the control unit instructs the user terminal to perform Inter-frequency handover to the neighboring cell. Accordingly, even when the frequency to which the D2D supporting cell belongs is different from the frequency to which the neighboring cell belongs, it is possible to perform handover while the user terminal maintains the D2D communication.

In a third embodiment, the neighboring cell supports the D2D communication, however, does not support the handover during which the D2D communication is maintained. When determining to perform the handover from the D2D supporting cell to the neighboring cell, the control unit controls so that the handover is performed after causing the user terminal to suspend the D2D communication. Accordingly, the D2D communication can be suspended before handover, so that it is possible to avoid the occurrence of an unexpected error caused by suspending the D2D communication immediately after the handover.

In the third embodiment, when the handover has been performed to the neighboring cell and the restart of the D2D communication is desired, the user terminal notifies the neighboring cell of a desire to perform the D2D communication. Accordingly, if the restart of the D2D communication is desired after handover, the user terminal is able to restart the D2D communication.

In a fourth embodiment, the neighboring cell does not support the D2D communication. When determining to perform the handover from the D2D supporting cell to the neighboring cell, the control unit controls so that the handover is performed after causing the user terminal to suspend the D2D communication. Accordingly, the D2D communication can be suspended before handover, so that it is possible to avoid the occurrence of an unexpected error caused by suspending the D2D communication immediately after the handover.

The base station according to the embodiments configures the D2D supporting cell that supports the D2D communication that is direct device to device communication. The base station includes a control unit controlling handover of the user terminal that performs the D2D communication in the D2D supporting cell. The control unit controls the handover on the basis of a support state of the D2D communication in a cell to which the user terminal performs handover.

The processor according to the embodiments is provided in the base station configuring the D2D supporting cell that supports the D2D communication that is direct device to device communication. The processor controls handover of the user terminal that performs the D2D communication in the D2D supporting cell on the basis of the support state of the D2D communication in a cell to which the user terminal performs handover.

The communication control method according to the embodiments is used in the mobile communication system that includes the base station configuring the D2D supporting cell that supports the D2D communication that is direct device to device communication, and the user terminal that performs the D2D communication in the D2D supporting cell. The communication control method includes a step A of controlling, by the base station, handover of the user terminal. In the step A, the base station controls the handover on the basis of the support state of the D2D communication in a cell to which the user terminal performs handover.

Hereinafter, with reference to the drawings, a description will be provided for each embodiment in which the D2D communication is introduced to a mobile communication system (LTE system) configured to conform to 3GPP standards.

First Embodiment

Hereinafter, a first embodiment will be described.

LTE System

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 configures a cell or a plurality of cells and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
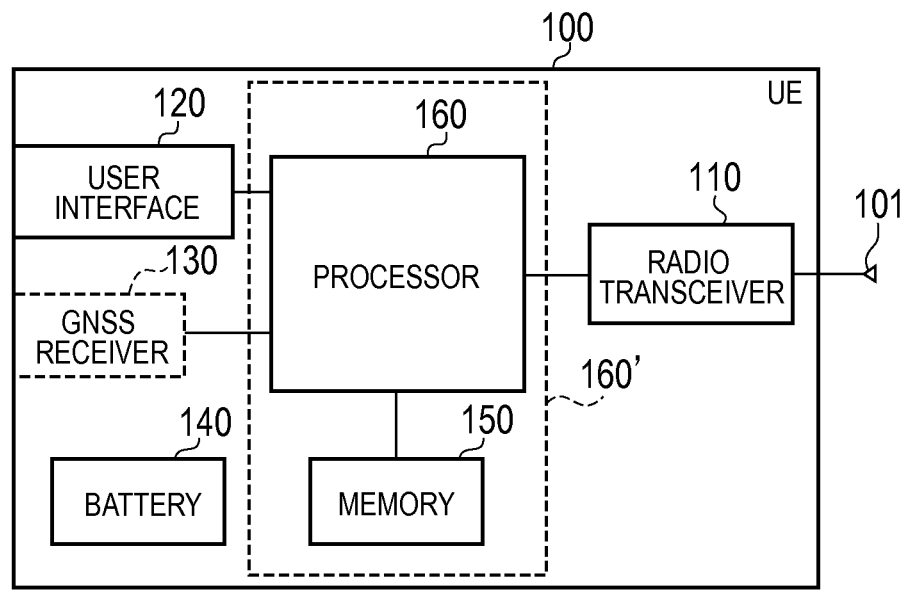
FIG. 2 is a block diagram of UE according to the first embodiment to the fourth embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons.

The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
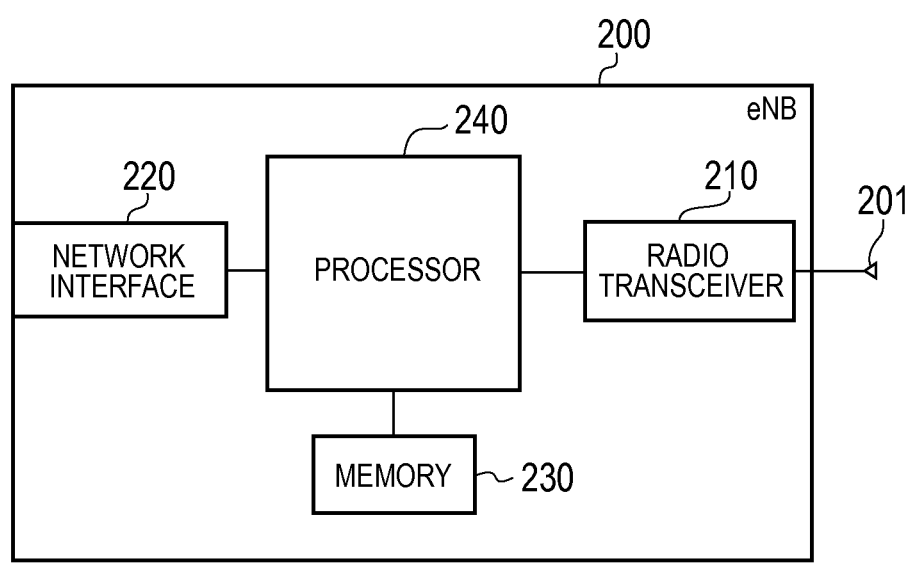
FIG. 3 is a block diagram of eNB according to the first embodiment to the fourth embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
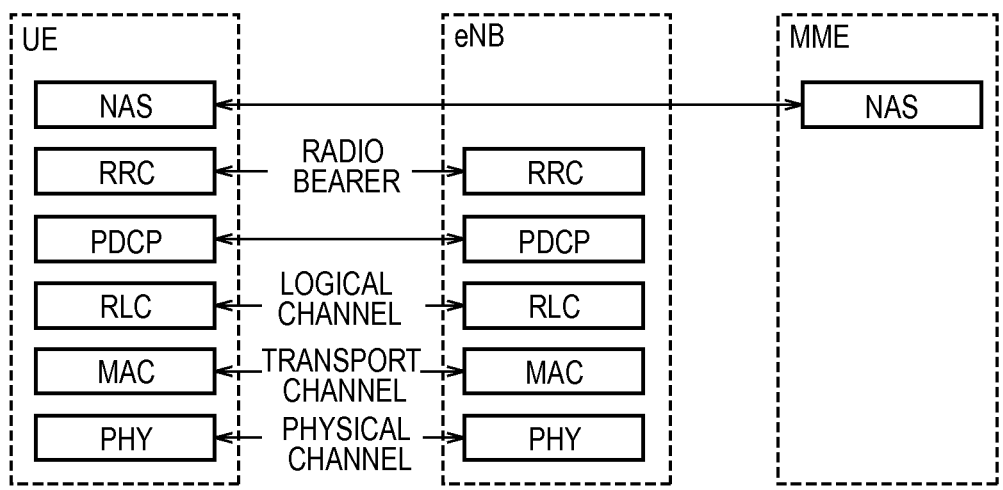
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state (a RRC connected state), and when the RRC connection is not established, the UE 100 is in an idle state (a RRC idle state).

A NAS (Non-Access Stratum) layer positioned above the RRC layer performs session management or mobility management, for example.

Figure 5:
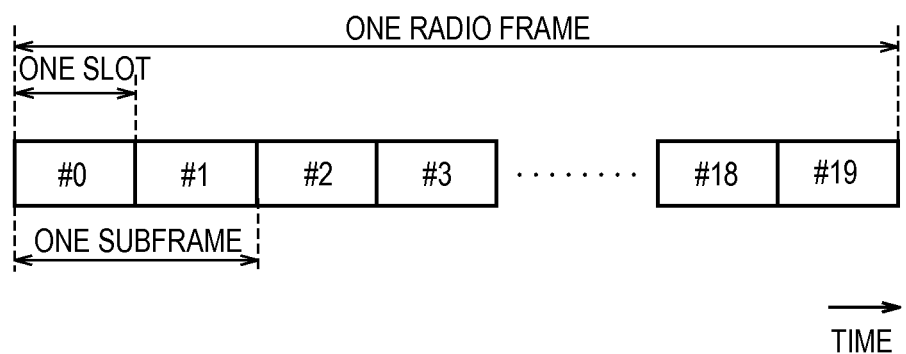
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, in the downlink, reference signals such as cell-specific reference signals are distributed and arranged in each subframe.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

D2D Communication

The LTE system according to the present embodiment supports the D2D communication. Hereinafter, the D2D communication will be described in comparison with the normal communication (the cellular communication) of the LTE system.

In the cellular communication, the data path set between UEs passes through the EPC 20. On the other hand, in the D2D communication, the data path set between the UEs does not pass through the EPC 20.

Figure 6:
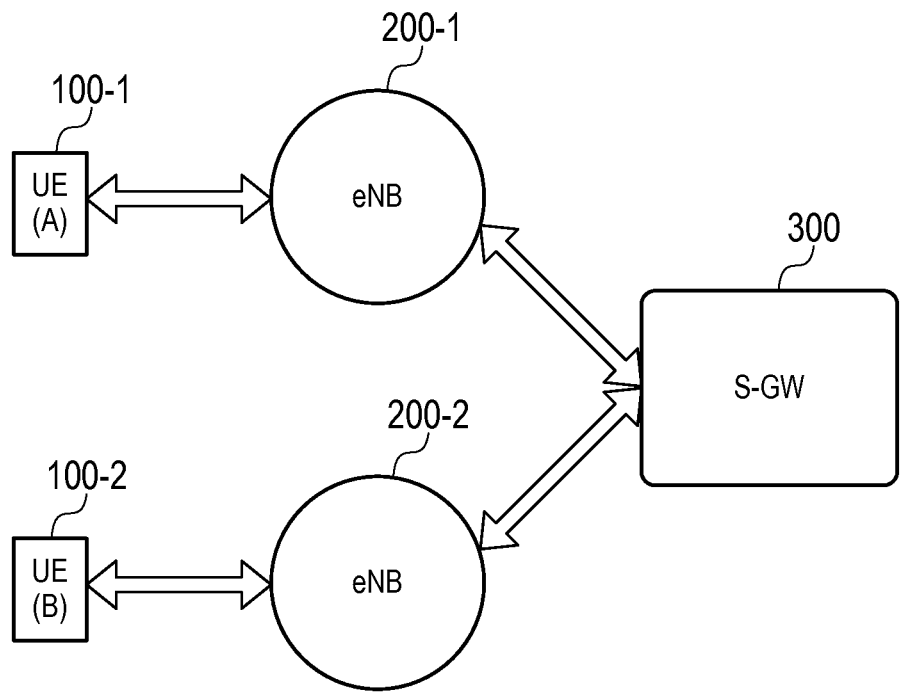
FIG. 6 illustrates a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the EPC 20 (the S-GW 300). Specifically, the data path is set to pass through the eNB 200-1, the S-GW 300, and the eNB 200-2.

Figure 7:
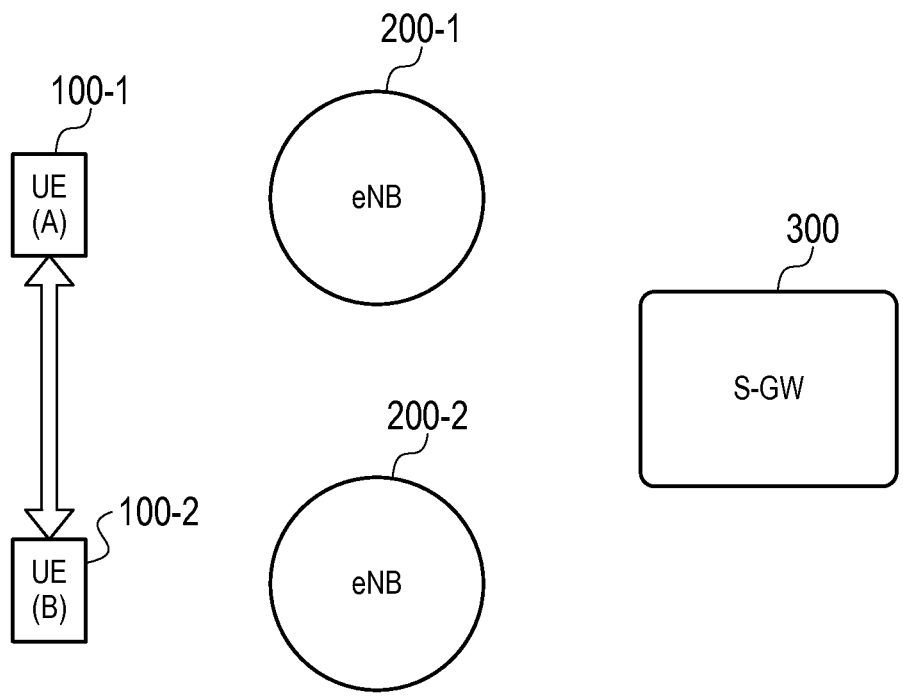
FIG. 7 illustrates an example of a data path in D2D communication.

FIG. 7 illustrates an example of the data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the EPC 20 (the S-GW 300). In the D2D communication, two modes exist. One of them is a direct communication mode in which the data path does not pass through the eNB 200. FIG. 7 illustrates a case of the D2D communication in the direct communication mode. The other one of them is a local relay mode in which the data path passes through the eNB 200. The local relay mode is called a Locally Routed mode.

As described above, when the UE 100-2 exists in the vicinity of the UE 100-1, the D2D communication is performed between the UE 100-1 and the UE 100-2, thereby obtaining an effect such as the reduction of a traffic load of the EPC 20 and a battery consumption amount of the UE 100.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts.

On the other hand, in the above-described case (b), for example, the UE 100-1 starts broadcasting a signal for the D2D communication. Thus, the UE 100 is capable of starting the D2D communication regardless of the existence of the discovery of a partner terminal.

Note that the D2D communication is considered to be performed in a frequency band (that is, in a frequency band of the cellular communication) of the LTE system, and for example, in order to avoid interference to the cellular communication, the D2D communication is performed under the control of the eNB 200.

Operation According to First Embodiment

Figure 8:
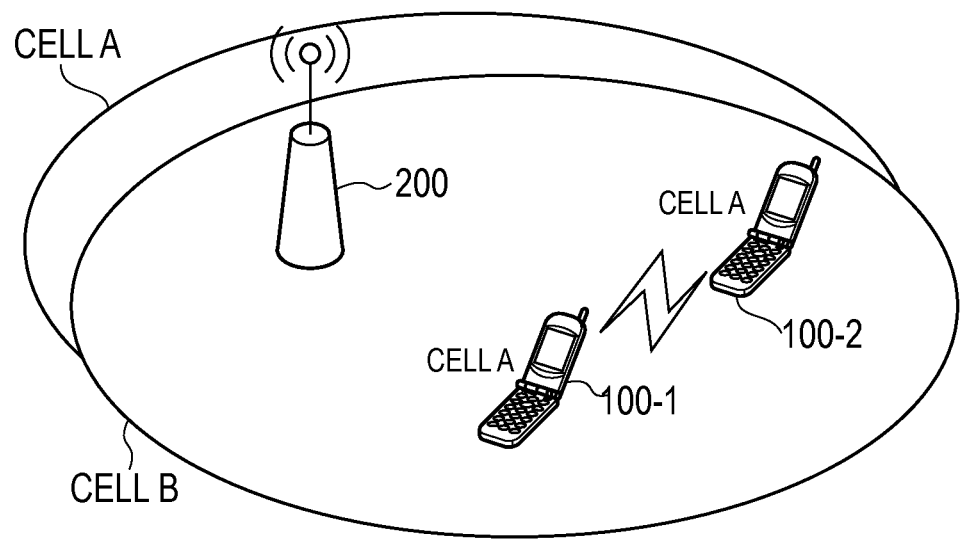
FIG. 8 is a diagram explaining an operation according to the first embodiment.
Figure 9:
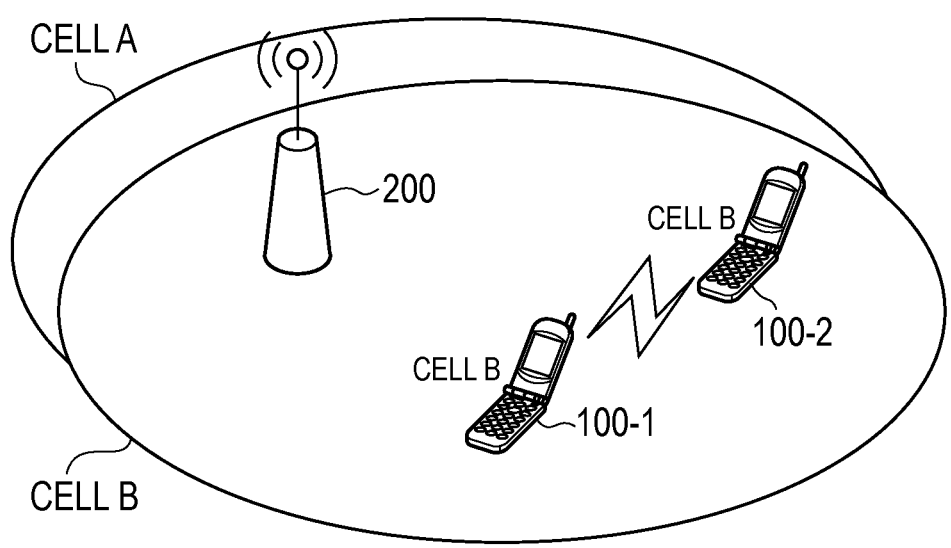
FIG. 9 is a diagram explaining the operation according to the first embodiment.

Hereinafter, an operation according to the present embodiment will be described. FIG. 8 and FIG. 9 are diagrams explaining the operation according to the present embodiment.

As illustrated in FIG. 8, the eNB 200 configures a plurality of cells. FIG. 8 illustrates two cells (a cell A and a cell B) approximately overlapping each other, however, the eNB 200 may configure three or more cells. The plurality of cells have respective different frequencies (career frequencies). That is, a frequency to which the cell A belongs is different from a frequency to which the cell B belongs.

Each of the cell A and cell B is a cell that supports the D2D communication (D2D supporting cell). Therefore, each of the cell A and cell B is able to perform the management and control of the D2D communication, such as assignment of a radio resource for the D2D communication. The eNB 200 comprehends that the cell A and cell B support the D2D communication.

The UE 100-1 and the UE 100-2 are connected with the cell A. That is, each of the UE 100-1 and UE 100-2 is in a state (connected state) in which the connection with the cell A is established.

The UE 100-1 and UE 100-2 perform the D2D communication in the cell A. The UE 100-1 and/or the UE 100-2 may perform cellular communication in addition to the D2D communication.

The eNB 200 (cell A) assigns a radio resource (D2D resource) for the D2D communication to the UE 100-1 and UE 100-2 dynamically or quasi-statically. Furthermore, the eNB 200 (cell A) may control transmission power in the D2D communication.

Under this communication environment, in view of circumstances such as deterioration of a radio environment of the UE 100-1 and UE 100-2 or increase of the load in the cell A, it is assumed that the eNB 200 has determined that it is difficult to continue the D2D communication of the UE 100-1 and UE 100-2 in the cell A.

In addition, the radio environment of the UE 100-1 and UE 100-2 can be comprehended by a measurement report from the UE 100-1 and UE 100-2, measurement in the eNB 200, or the like. The load in the cell A can be comprehended by a radio resource consumption amount in the cell A, a traffic amount transmitted and received by the eNB 200 in the cell A, or the like.

When determining that it is difficult to continue the D2D communication of the UE 100-1 and UE 100-2 in the cell A, the eNB 200 determines to perform the Inter-frequency handover of the UE 100-1 and UE 100-2 to the cell B (another D2D supporting cell) that supports the D2D communication. The eNB 200 controls so that the handover is performed while causing the UE 100-1 and UE 100-2 to maintain the D2D communication.

Specifically, when determining to perform the handover of the UE 100-1 and UE 100-2 to the cell B, the eNB 200 secures a radio resource for the D2D communication in the cell B and then instructs the UE 100-1 and UE 100-2 to perform the handover to the cell B. At this time, the eNB 200 may notify the UE 100-1 and UE 100-2 that it is possible to perform the D2D communication in a handover destination (alternatively, of a radio resource assigned to the D2D communication in the handover destination).

As illustrated in FIG. 9, the UE 100-1 and UE 100-2 performs the handover to the cell B while maintaining the D2D communication under the control of the eNB 200. After the handover is completed, the UE 100-1 and UE 100-2 perform the D2D communication in a state (connected state) in which the connection with the cell B is established. In addition, the UE 100-1 and/or the UE 100-2 may perform the cellular communication in addition to the D2D communication.

Summary of First Embodiment

As described above, in the present embodiment, when determining to perform handover from the cell A (D2D supporting cell) to the cell B (another D2D supporting cell), the eNB 200 controls so that the handover is performed while causing the UE 100-1 and UE 100-2 to maintain the D2D communication. Accordingly, depending on changes in a communication situation and the like, it is possible to perform handover while the UE 100-1 and UE 100-2 maintain the D2D communication.

Second Embodiment

Hereinafter, a second embodiment will be described while focusing on the differences from the aforementioned first embodiment.

In the aforementioned first embodiment, Intra-eNB handover is described. However, in the second embodiment, Inter-eNB handover will be described.

Operation Overview

Figure 10:
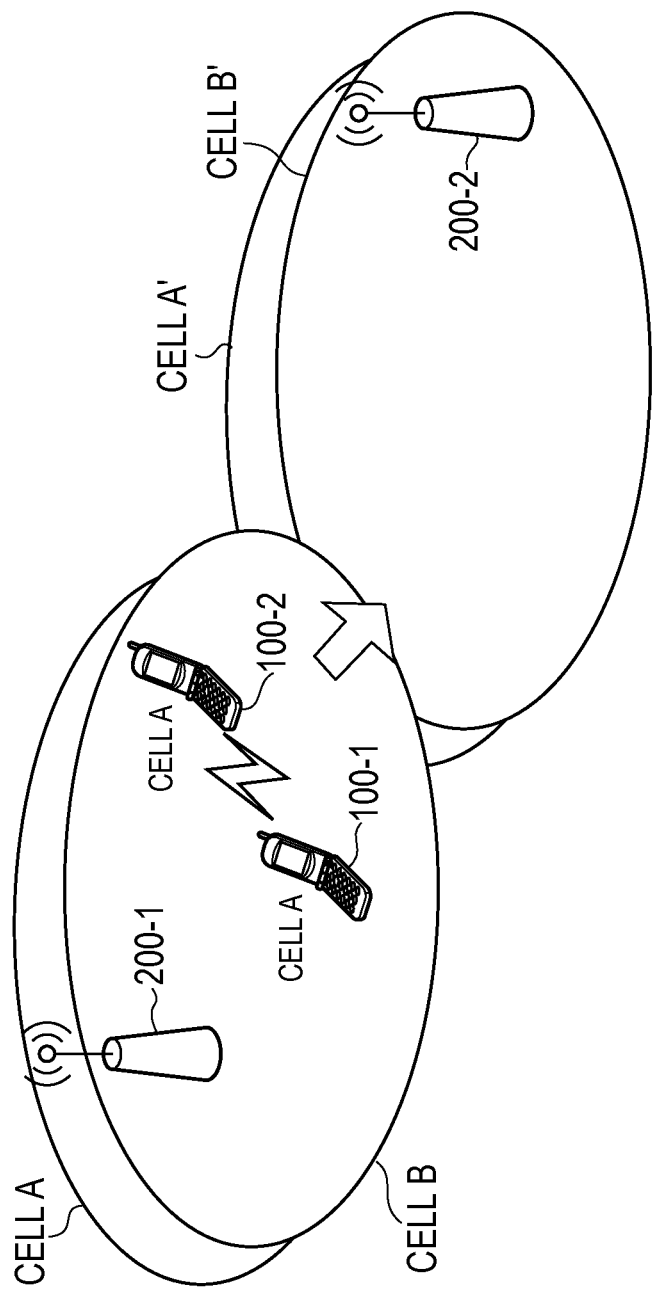
FIG. 10 is a diagram explaining an operation according to a second embodiment.
Figure 11:
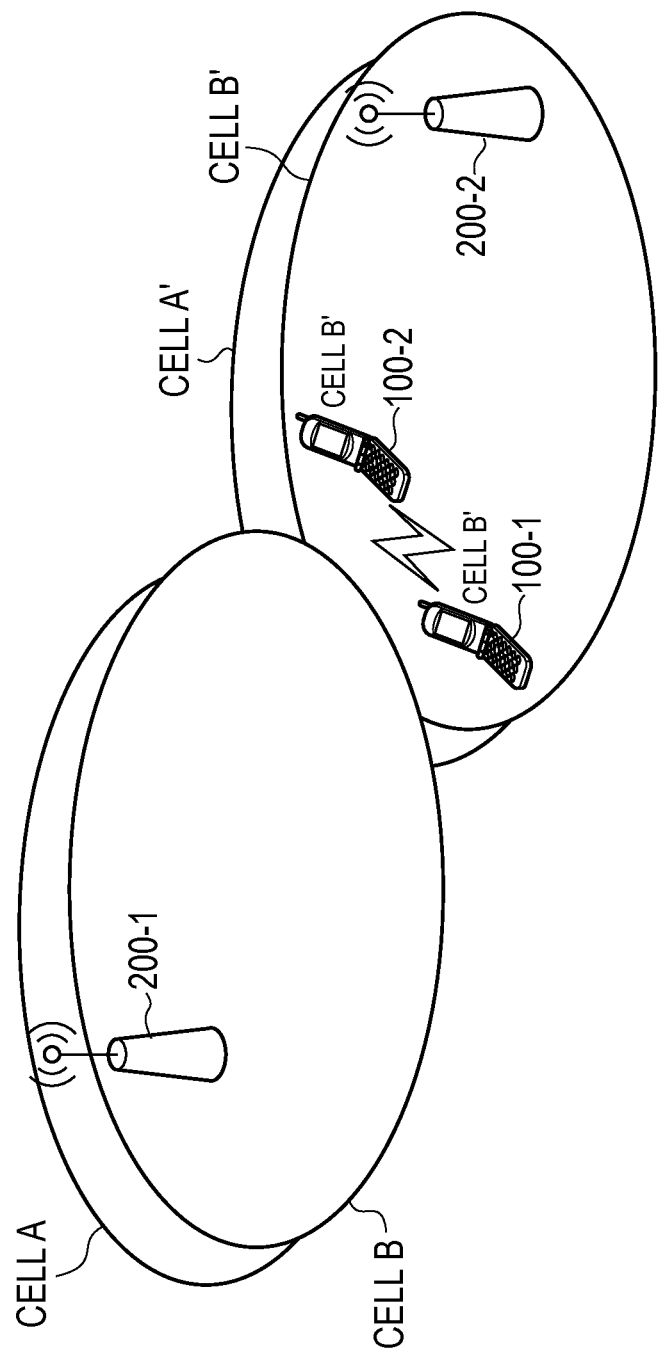
FIG. 11 is a diagram explaining the operation according to the second embodiment.

FIG. 10 and FIG. 11 are diagrams explaining an operation according to the present embodiment.

As illustrated in FIG. 10, the eNB 200-1 (base station) configures two cells (the cell A and the cell B) approximately overlapping each other. The cell A and cell B differ in frequencies to which they belong. Each of the cell A and cell B supports the D2D communication.

The eNB 200-2 (neighboring base station) configures the cells (the cell A and the cell B) of the eNB 200-1 and adjacent two cells (a cell A' and a cell B'). The cell A' and cell B' differ in frequencies to which they belong. The cell A' belongs to the same frequency as that of the cell A, and the cell B' belongs to the same frequency as that of the cell B.

In the present embodiment, each of the cell A' and cell B' supports the D2D communication. Furthermore, each of the cell A' and cell B' supports handover during which the D2D communication is maintained. However, the cell A' may be a cell that does not support the D2D communication or a cell that does not support the handover during which the D2D communication is maintained.

In addition, each of the eNB 200-1 and the eNB 200-2 may configure not only two cells but one cell or three or more cells.

The UE 100-1 and UE 100-2 are connected with the cell A of the eNB 200-1. That is, each of the UE 100-1 and UE 100-2 is in a state (connected state) in which the connection with the cell A is established.

The UE 100-1 and UE 100-2 perform the D2D communication in the cell A. The UE 100-1 and/or the UE 100-2 may perform cellular communication in addition to the D2D communication.

The eNB 200-1 (cell A) assigns a radio resource (D2D resource) for the D2D communication to the UE 100-1 and UE 100-2 dynamically or quasi-statically. Furthermore, the eNB 200-1 (cell A) may control transmission power in the D2D communication.

A situation in which the UE 100-1 and UE 100-2 move toward the cell A' and cell B' is considered. In this case, a radio environment of the UE 100-1 and UE 100-2 in the cell A is deteriorated, so that the eNB 200 determines to perform handover of the UE 100-1 and UE 100-2 to the cell A' or the cell B'.

In addition, the radio environment of the UE 100-1 and UE 100-2 can be comprehended by a measurement report from the UE 100-1 and UE 100-2. In the present embodiment, the measurement report indicates that the radio environment of the cell B' is good, so that it is assumed that the handover to the cell B' has been determined to be performed.

When determining to perform handover from the cell A to the cell B', the eNB 200-1 controls so that the handover is performed while causing the UE 100-1 and UE 100-2 to maintain the D2D communication. However, it should be noted that different control is performed when the D2D communication cannot be performed in the cell B' due to, for example, the communication situation of the cell B'. A detailed content of a handover procedure (operation patterns 1 to 3) will be described later.

After the handover to the cell B' is completed while the D2D communication is maintained, the UE 100-1 and UE 100-2 perform the D2D communication in a state (connected state) in which the connection with the cell B' is established. In addition, the UE 100-1 and/or the UE 100-2 may perform the cellular communication in addition to the D2D communication.

Operation Pattern 1

Figure 12:
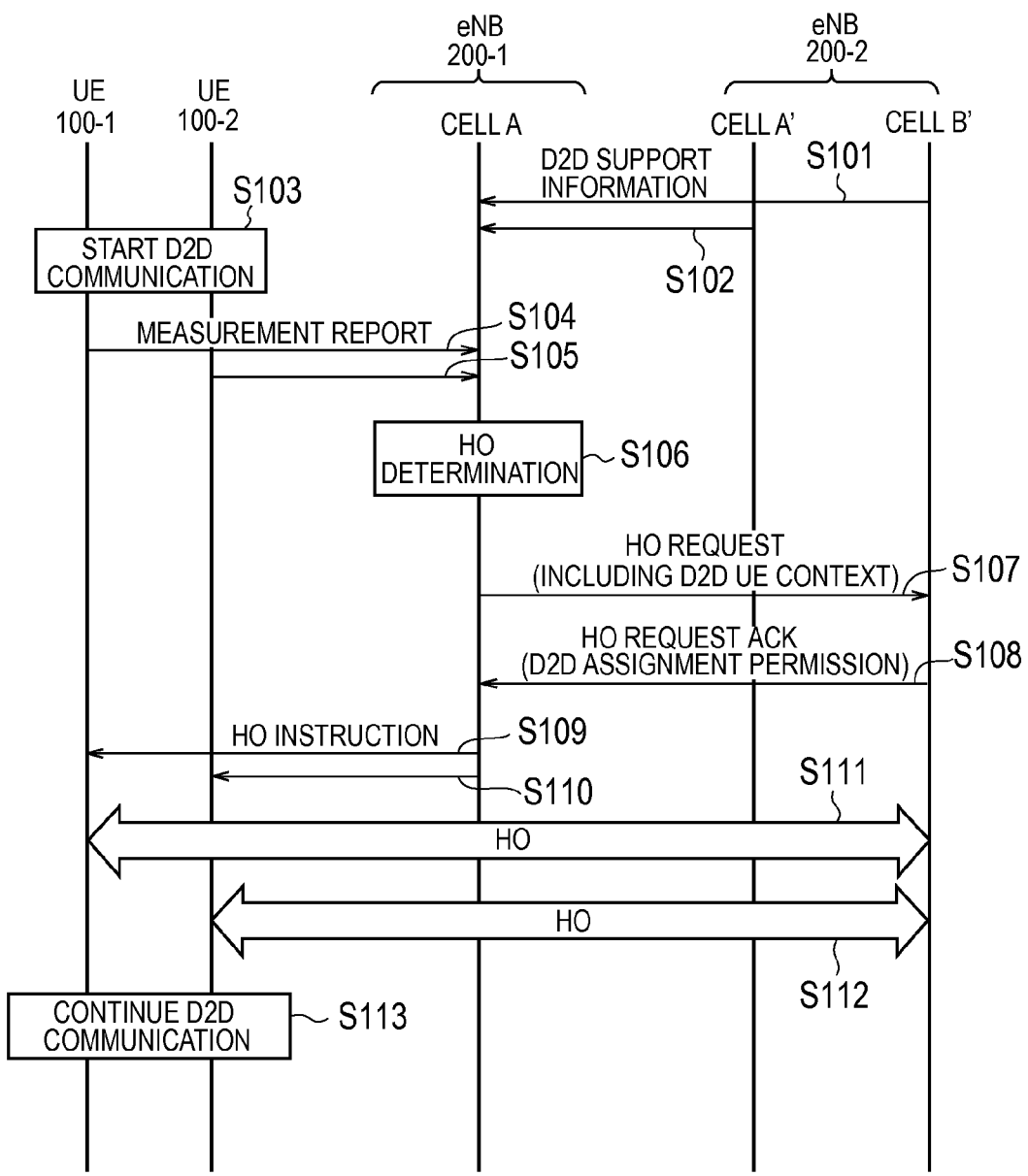
FIG. 12 is a sequence diagram of an operation pattern 1 according to the second embodiment.

Next, an operation pattern 1 according to the present embodiment will be described. FIG. 12 is a sequence diagram of the operation pattern 1 according to the present embodiment.

As illustrated in FIG. 12, in steps S101 and S102, the eNB 200-2 transmits, to the eNB 200-1, D2D support information related to a support state of the D2D communication in the cell A' and cell B' through an X2 interface or an S1 interface. When the D2D support information is transmitted through the X2 interface, the D2D support information may be included in an eNB Configuration Update message indicating a setting state in the eNB 200-2.

The D2D support information includes information indicating whether each of the cell A' and cell B' supports the D2D communication. The D2D support information may further include information indicating whether each of the cell A' and cell B' supports handover during which the D2D communication is maintained.

When the support state of the D2D communication in the cell A' and cell B' is changed, the eNB 200-2 transmits, to the eNB 200-1, the D2D support information. Alternatively, the eNB 200-2 may periodically transmit the D2D support information to the eNB 200-1.

On receiving the D2D support information from the eNB 200-2, the eNB 200-1 stores the received D2D support information.

In step S103, the UE 100-1 and UE 100-2 start the D2D communication in the cell A.

In steps S104 and S105, each of the UE 100-1 and UE 100-2 transmits a measurement report to the eNB 200-1. The measurement report includes information indicating reference signal received power for each of a serving cell (the cell A) and a neighboring cell (such as the cell A' and cell B').

In step S106, the eNB 200-1 performs handover determination on the basis of the measurement report received from each of the UE 100-1 and UE 100-2. Here, the reference signal received power for the cell B' has a satisfactory value and the cell B' supports the D2D communication, so that the eNB 200-1 determines to perform handover of the UE 100-1 and UE 100-2 from the cell A to the cell B'.

In step S107, the eNB 200-1 transmits, to the eNB 200-2, a handover request for requesting handover to the cell B' through the X2 interface or the S1 interface. The handover request includes information (D2D context) indicating that the UE 100-1 and UE 100-2 perform the D2D communication. The eNB 200-1 may transmit handover requests to the UE 100-1 and UE 100-2 individually, or may transmit one handover request to the UE 100-1 and UE 100-2 collectively.

The eNB 200-2 determines whether to permit the handover request from the eNB 200-1 on the basis of the handover request, in consideration that the UE 100-1 and UE 100-2 are performing the D2D communication. Furthermore, the eNB 200-2 performs preparation, such as security of a radio resource for the D2D communication.

In the operation pattern 1, the following description will be given on the assumption that the eNB 200-2 has permitted the handover request and has successfully secured the radio resource for the D2D communication.

In step S108, the eNB 200-2 transmits, to the eNB 200-1, a permission response (HO Request ACK) including D2D assignment information related to assignment of the radio resource for the D2D communication in the cell B' through the X2 interface or the S1 interface. Here, the D2D assignment information is information indicating that the D2D communication is able to be assigned in the cell B'. Alternatively, the D2D assignment information may be information indicating a radio resource assigned for the D2D communication.

The eNB 200-1 determines that it is possible to perform handover to the cell B' while the D2D communication is maintained on the basis of the permission response from the eNB 200-2.

In steps S109 and S110, the eNB 200-1 instructs the UE 100-1 and UE 100-2 to perform the Inter-frequency handover to the cell B'. At this time, the eNB 200-1 may notify the UE 100-1 and UE 100-2 that it is possible to perform the D2D communication in a handover destination (alternatively, of a radio resource assigned to the D2D communication in the handover destination).

In steps S111 and S112, the UE 100-1 and UE 100-2 perform the handover to the cell B' while maintaining the D2D communication, in response to the instruction (and notification) from the eNB 200-1.

In step S113, the UE 100-1 and UE 100-2 perform the D2D communication in a state (connected state) in which the connection with the cell B' is established.

Operation Pattern 2

Next, an operation pattern 2 according to the present embodiment will be described while focusing on the differences from the aforementioned operation pattern 1. FIG. 13 is a sequence diagram of the operation pattern 2 according to the present embodiment.

As illustrated in FIG. 13, operations insteps S201 to S207 are equal to those of the operation pattern 1.

In step S208, the eNB 200-2 determines whether to permit a handover request from the eNB 200-1 on the basis of the handover request, in consideration that the UE 100-1 and UE 100-2 are performing the D2D communication. Furthermore, the eNB 200-2 performs preparation, such as security of a radio resource for the D2D communication.

In the operation pattern 2, the following description will be given on the assumption that the eNB 200-2 has permitted the handover request and has failed to secure the radio resource for the D2D communication.

In step S208, the eNB 200-2 transmits, to the eNB 200-1, a permission response (HO Request ACK) including D2D assignment information related to assignment of the radio resource for the D2D communication in the cell B' through the X2 interface or the S1 interface. Here, the D2D assignment information is information indicating that the D2D communication is not able to be assigned in the cell B'. Furthermore, the D2D assignment information may include information indicating a reason why the D2D communication is not able to be assigned in the cell B'.

The eNB 200-1 determines that it is not possible to perform handover to the cell B' while the D2D communication is maintained on the basis of the permission response from the eNB 200-2.

In steps S209 and S210, the eNB 200-1 instructs the UE 100-1 and UE 100-2 to suspend the D2D communication. Alternatively, the eNB 200-1 may suspend the assignment of the radio resource for the D2D communication, instead of instruction to suspend the D2D communication.

In step S211, the UE 100-1 and UE 100-2 suspend the D2D communication.

In step S212, the eNB 200-1 transmits, to the eNB 200-2, information indicating that the handover to the cell B' is to be suspended through the X2 interface or the S1 interface.

In step S213, the eNB 200-1 transmits, to the eNB 200-2, a handover request for requesting handover to the cell A' through the X2 interface or the S1 interface. That is because there is possibility to restart the D2D communication in the cell A' after the handover. In addition, in the aforementioned measurement report, a condition that reference signal received power for the cell A' has a satisfactory value (more than a handover threshold) needs to be satisfied.

The eNB 200-2 determines whether to permit a handover request from the eNB 200-1 on the basis of the handover request. Here, the following description will be given on the assumption that the eNB 200-2 has permitted the handover request.

In step S214, the eNB 200-2 transmits, to the eNB 200-1, a permission response (HO Request ACK) through the X2 interface or the S1 interface.

In steps S215 and S216, the eNB 200-1 instructs the UE 100-1 and UE 100-2 to perform Intra-frequency handover to the cell A' on the basis of the permission response from the eNB 200-2. At this time, the eNB 200-1 may notify the UE 100-1 and UE 100-2 that a handover destination supports the D2D communication.

In steps S217 and S218, the UE 100-1 and UE 100-2 perform the handover to the cell A', in response to the instruction (and notification) from the eNB 200-1.

Operation Pattern 3

Next, an operation pattern 3 according to the present embodiment will be described while focusing on the differences from the aforementioned operation pattern 2. FIG. 14 is a sequence diagram of the operation pattern 3 according to the embodiment.

As illustrated in FIG. 14, operations in steps S301 to S311 are equal to those of the operation pattern 2.

In steps S312 and S313, the eNB 200-1 instructs the UE 100-1 and UE 100-2 to perform the Intra-frequency handover to the cell A'. At this time, the eNB 200-1 may notify the UE 100-1 and UE 100-2 that a handover destination supports the D2D communication.

In steps S314 and S315, the UE 100-1 and UE 100-2 perform the handover to the cell A', in response to the instruction (and notification) from the eNB 200-1.

Summary of Second Embodiment

As described above, in the present embodiment, the eNB 200-1 controls handover of the UE 100-1 and UE 100-2 from the cell A to the cell B' on the basis of the D2D support information from the eNB 200. Accordingly, it is possible to appropriately control the Inter-eNB handover of the UE 100-1 and UE 100-2 during the D2D communication.

In the present embodiment, the cell A' and cell B' support the D2D communication and the handover during which the D2D communication is maintained. When determining to perform handover from the cell A to the cell B', the eNB 200-1 controls so that the handover is performed while causing the UE 100-1 and UE 100-2 to maintain the D2D communication. Accordingly, it is possible to perform the Inter-eNB handover while the UE 100-1 and UE 100-2 maintain the D2D communication.

In the present embodiment, when determining to perform the handover from the cell A to the cell B', the eNB 200-1 transmits, to the eNB 200-2, a handover request that includes information indicating that the UE 100-1 and UE 100-2 are performing the D2D communication. Accordingly, the eNB 200-2 is able to determine whether to permit the handover request, in consideration that the UE 100-1 and UE 100-2 are performing the D2D communication. Furthermore, the eNB 200-2 is able to perform preparation, such as security of a radio resource for the D2D communication.

In the present embodiment, when permitting the handover request, the eNB 200-2 transmits, to the eNB 200-1, a permission response that includes D2D assignment information related to assignment of the radio resource for the D2D communication in the cell B'. Accordingly, the eNB 200-1 is able to appropriately control handover, in consideration whether the radio resource for the D2D communication is assigned in the eNB 200-2.

In the present embodiment, when the permission response from the eNB 200-2 is received and the D2D assignment information indicates that the radio resource for the D2D communication is not able to be assigned, the eNB 200-1 suspends the handover to the cell B'. Accordingly, the D2D communication can be suspended before handover, so that it is possible to avoid the occurrence of an unexpected error caused by suspending the D2D communication immediately after the handover.

In the present embodiment, when the permission response from the eNB 200-2 is received and a frequency to which the cell A belongs is different from a frequency to which the cell B' belongs, the eNB 200-1 instructs the UE 100-1 and UE 100-2 to perform the Inter-frequency handover to the cell B'. Accordingly, even when the frequency to which the cell A belongs is different from the frequency to which the cell B' belongs, it is possible to perform handover while the UE 100-1 and UE 100-2 maintain the D2D communication.

Third Embodiment

Hereinafter, a third embodiment will be described while focusing on the differences from the aforementioned second embodiment.

In the aforementioned second embodiment, the cell A' and cell B' support the D2D communication and the handover during which the D2D communication is maintained.

In contrast, in the third embodiment, a case is considered in which the cell A' and cell B' support the D2D communication, however, do not support the handover during which the D2D communication is maintained. In addition, the cell A' may be a cell that does not support the D2D communication.

In the present embodiment, the eNB 200-1 and eNB 200-2 share in advance that the handover during which the D2D communication is maintained is not supported when the UE 100 performing the D2D communication in the cell of the eNB 200-1 and eNB 200-2 exists.

FIG. 15 is a sequence diagram according to the present embodiment. A description of an operation overlapping that of the aforementioned second embodiment will be appropriately omitted.

As illustrated in FIG. 15, in step S401, the UE 100-1 and UE 100-2 start the D2D communication in the cell A.

In steps S402 and S403, the eNB 200-2 transmits, to the eNB 200-1, D2D support information related to a support state of the D2D communication in the cell A' and cell B' through the X2 interface or the S1 interface. In the present embodiment, the D2D support information further includes information indicating whether each of the cell A' and cell B' supports handover during which the D2D communication is maintained. The eNB 200-2 may transmit the D2D support information to the eNB 200-1, in response to a request from the eNB 200-1.

On receiving the D2D support information from the eNB 200-2, the eNB 200-1 stores the received D2D support information.

In steps S404 and S405, each of the UE 100-1 and UE 100-2 transmits a measurement report to the eNB 200-1.

In step S406, the eNB 200-1 performs handover determination on the basis of the measurement report received from each of the UE 100-1 and UE 100-2. Here, the reference signal received power for the cell B' has a satisfactory value and the cell B' supports the D2D communication, so that the eNB 200-1 determines to perform handover of the UE 100-1 and UE 100-2 from the cell A to the cell B'.

In steps S407 and S408, the eNB 200-1 comprehends that the cell B' does not support the handover during which the D2D communication is maintained, so that the eNB 200-1 instructs the UE 100-1 and UE 100-2 to suspend the D2D communication. Alternatively, the eNB 200-1 may suspend the assignment of the radio resource for the D2D communication, instead of instruction to suspend the D2D communication.

In step S409, the UE 100-1 and UE 100-2 suspend the D2D communication.

In step S410, the eNB 200-1 transmits, to the eNB 200-2, a handover request for requesting handover to the cell B' through the X2 interface or the S1 interface. In the present embodiment, the handover request does not include the aforementioned information (D2D context), however, the eNB 200-1 may include the information (D2D context) in the handover request.

The eNB 200-2 determines whether to permit a handover request from the eNB 200-1 on the basis of the handover request. Here, the following description will be given on the assumption that the eNB 200-2 has permitted the handover request.

In step S411, the eNB 200-2 transmits, to the eNB 200-1, a permission response (HO Request ACK) through the X2 interface or the S1 interface.

In steps S412 and S413, the eNB 200-1 instructs the UE 100-1 and UE 100-2 to perform the Inter-frequency handover to the cell B'. At this time, the eNB 200-1 may notify the UE 100-1 and UE 100-2 that a handover destination supports the D2D communication.

In steps S414 and S415, the UE 100-1 and UE 100-2 perform the handover to the cell B', in response to the instruction (and notification) from the eNB 200-1. Here, the following description will be given on the assumption that the UE 100-1 and UE 100-2 desire the restart of the D2D communication after the handover.

In steps S416 and S417, each of the UE 100-1 and UE 100-2 transmits, to the eNB 200-2 (cell B'), information (indication) on the desire to perform the D2D communication. Here, the following description will be given on the assumption that the eNB 200-2 has permitted the D2D communication.

In steps S418 and S419, the eNB 200-2 notifies the UE 100-1 and UE 100-2 of the permission to perform the D2D communication and/or of the radio resource for the D2D communication.

In step S420, the UE 100-1 and UE 100-2 restart the D2D communication in a state (connected state) in which the connection with the cell B' is established.

As described above, in the present embodiment, when determining to perform the handover from the cell A to the cell B', the eNB 200-1 controls so that the handover is performed after causing the UE 100-1 and UE 100-2 to suspend the D2D communication. Accordingly, the D2D communication can be suspended before handover, so that it is possible to avoid the occurrence of an unexpected error caused by suspending the D2D communication immediately after the handover.

In the present embodiment, when the handover has been performed to the cell B' and the restart of the D2D communication is desired, the UE 100-1 and UE 100-2 notifies the cell B' of a desire to perform the D2D communication. Accordingly, if the restart of the D2D communication is desired after handover, the UE 100-1 and UE 100-2 is able to restart the D2D communication.

Fourth Embodiment

Hereinafter, a fourth embodiment will be described while focusing on the differences from the aforementioned second and third embodiments.

In the aforementioned second and third embodiments, the cell A' and cell B' support the D2D communication.

In contrast, in the fourth embodiment, a case is considered in which the cell A' and cell B' do not support the D2D communication.

Operations in such a case are equal to those in FIG. 15. That is, when determining to perform handover from the cell A to the cell B', the eNB 200-1 controls so that the handover is performed after causing the UE 100-1 and UE 100-2 to suspend the D2D communication. Accordingly, the D2D communication can be suspended before handover, so that it is possible to avoid the occurrence of an unexpected error caused by suspending the D2D communication immediately after the handover.

However, in the present embodiment, it should be noted that the UE 100-1 and UE 100-2 are not able to restart the D2D communication even when the handover has been performed to the cell B' and the restart of the D2D communication is desired.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

Each of the aforementioned embodiments has described an example in which both the UE 100-1 and UE 100-2 establish connections with the eNB 200. However, only one of the UE 100-1 and UE 100-2 (so-called anchor UE) may establish a connection with the eNB 200. The anchor UE communicates with the eNB 200 as a representative of a group of UEs performing the D2D communication. In this case, the eNB 200 is not required to instruct or notify both the UE 100-1 and UE 100-2, and may instruct or notify only the anchor UE.

In the aforementioned embodiments, the eNB 200-1 comprehends whether the cells of the eNB 200-2 support the D2D communication by receiving, from the eNB 200-2, the D2D support information in the cells (specifically, the cell A' and cell B') of the eNB 200-2 (the neighboring base station). However, it is not limited thereto. For example, the eNB 200-1 comprehends whether the cells of the eNB 200-2 support the D2D communication by notification from an entity included in the core network.

For example, the entity transmits a notification (corresponding to the D2D support information) for setting the same radio resource and/or frequency band as a radio resource and/or frequency band used for the D2D communication for a plurality of eNBs 200 existing in a predetermined area (such as a predetermined tracking area). The following description will be given on the assumption that the entity has transmitted the notification for setting the same radio resource as a radio resource used for the D2D communication.

Next, each of the eNB 200-1 and the eNB 200-2 included in the plurality of eNBs 200 sets a radio resource designated by the entity as a radio resource used for the D2D communication on the basis of the notification from the entity. Thus, each of cells of the eNB 200-1 and the eNB 200-2 supports the D2D communication. Accordingly, the eNB 200-1 comprehends whether the cell of the eNB 200-2 supports the D2D communication because the eNB 200-1 determines that the cell of the eNB 200-2 supports the D2D communication, by the notification from the entity. Each of the plurality of eNBs 200 assigns the radio resource designated by the entity to UE 100 becoming a target of the handover. Thus, the UE 100 performs the handover while the UE 100 maintains the D2D communication.

In addition, each of the plurality of eNBs 200 may set the radio resource designated by the entity as a dedicated radio resource for the D2D communication or a common radio resource for the D2D communication and the cellular communication. Furthermore, each of the plurality of eNBs 200 may independently set a radio resource other than the radio resource designated by the entity as the radio resource used for the D2D communication.

In addition, the entity may be a device being able to transmit the notification for setting the same radio resource and/or frequency band as a radio resource and/or frequency band used for the D2D communication for the plurality of eNBs 200. For example, the entity may be a MMC or an OAM, or a D2D management server placed for management of the D2D communication.

Each of the aforementioned embodiments has described an example in which the present invention is applied to an LTE system. However, the present invention may also be applied to systems, other than the LTE system, as well as the LTE system.

In addition, the entire content of U.S. Provisional Application No. 61/730,618 (filed on Nov. 28, 2012) is incorporated in the present specification by reference.

INDUSTRIAL APPLICABILITY

As described above, the mobile communication system, a base station, a processor, and a communication control method according to the present invention, are possible to appropriately control handover for a user terminal during the D2D communication, and thus are useful in a mobile communication field.

The invention claimed is:

1. A mobile communication system comprising:
    a base station configuring a Device to Device (D2D) supporting cell that supports D2D communication that is direct device to device communication;
    a user terminal that performs the D2D communication in the D2D supporting cell; and
    a neighboring base station configuring a neighboring cell adjacent to the D2D supporting cell, wherein
    the base station comprises a control unit that controls handover of the user terminal, and
    the control unit transmits, to the neighboring base station, a handover request that includes information indicating that the user terminal is performing the D2D communication when determining to perform the handover from the D2D supporting cell to the neighboring cell.

2. The mobile communication system according to claim 1, wherein
    the neighboring base station transmits, to the base station, D2D support information related to the support state of the D2D communication in the neighboring cell, and
    the control unit controls the handover to the neighboring cell on the basis of the D2D support information.

3. The mobile communication system according to claim 2, wherein
    the neighboring cell supports the D2D communication, and supports the handover during which the D2D communication is maintained, and
    when determining to perform the handover from the D2D supporting cell to the neighboring cell, the control unit controls so that the handover is performed while causing the user terminal to maintain the D2D communication.

4. The mobile communication system according to claim 2, wherein
    the neighboring cell supports the D2D communication, and does not support the handover during which the D2D communication is maintained, and
    when determining to perform the handover from the D2D supporting cell to the neighboring cell, the control unit controls so that the handover is performed after causing the user terminal to suspend the D2D communication.

5. The mobile communication system according to claim 4, wherein
    when the handover has been performed to the neighboring cell and the restart of the D2D communication is desired, the user terminal notifies the neighboring cell of a desire to perform the D2D communication.

6. The mobile communication system according to claim 2, wherein
    the neighboring cell does not support the D2D communication, and
    when determining to perform the handover from the D2D supporting cell to the neighboring cell, the control unit controls so that the handover is performed after causing the user terminal to suspend the D2D communication.

7. The mobile communication system according to claim 1, wherein
    when permitting the handover request, the neighboring base station transmits, to the base station, a permission response that includes D2D assignment information related to assignment of a radio resource for the D2D communication in the neighboring cell.

8. The mobile communication system according to claim 7, wherein
when the permission response from the neighboring base station is received and the D2D assignment information indicates that the radio resource for the D2D communication is not able to be assigned, the control unit suspends the handover to the neighboring cell.

9. The mobile communication system according to claim 7, wherein
when the permission response from the neighboring base station is received and a frequency to which the D2D supporting cell belongs is different from a frequency to which the neighboring cell belongs, the control unit instructs the user terminal to perform Inter-frequency handover to the neighboring cell.

10. A base station configuring a Device to Device (D2D) supporting cell that supports D2D communication that is direct device to device communication, comprising:
a control unit that controls handover of a user terminal that performs the D2D communication in the D2D supporting cell, wherein
the control unit transmits, to a neighboring base station configuring a neighboring cell adjacent to the D2D supporting cell, a handover request that includes information indicating that the user terminal is performing the D2D communication when determining to perform the handover from the D2D supporting cell to the neighboring cell.

11. A processor provided in a base station configuring a Device to Device (D2D) supporting cell that supports D2D communication that is direct device to device communication, wherein
the processor executes a process of transmitting to a neighboring base station configuring a neighboring cell adjacent to the D2D supporting cell, a handover request that includes information indicating that the user terminal is performing the D2D communication when determining to perform a handover of a user terminal from the D2D supporting cell to the neighboring cell.

12. A base station comprising:
a transmitter configured to transmit a handover request to another base station, and
a receiver configured to receive a handover request acknowledgement from the another base station, wherein
the handover request acknowledgement including information indicating a radio resource used for Device to Device (D2D) communication that is direct device to device communication.

13. The base station according to claim 12, wherein
the transmitter transmits the handover request including information related to the D2D communication.

* * * * *